G. ZINT.
AUTOMATIC SPRINKLER.
APPLICATION FILED AUG. 21, 1913.
1,131,767.
Patented Mar. 16, 1915.
4 SHEETS—SHEET 1.
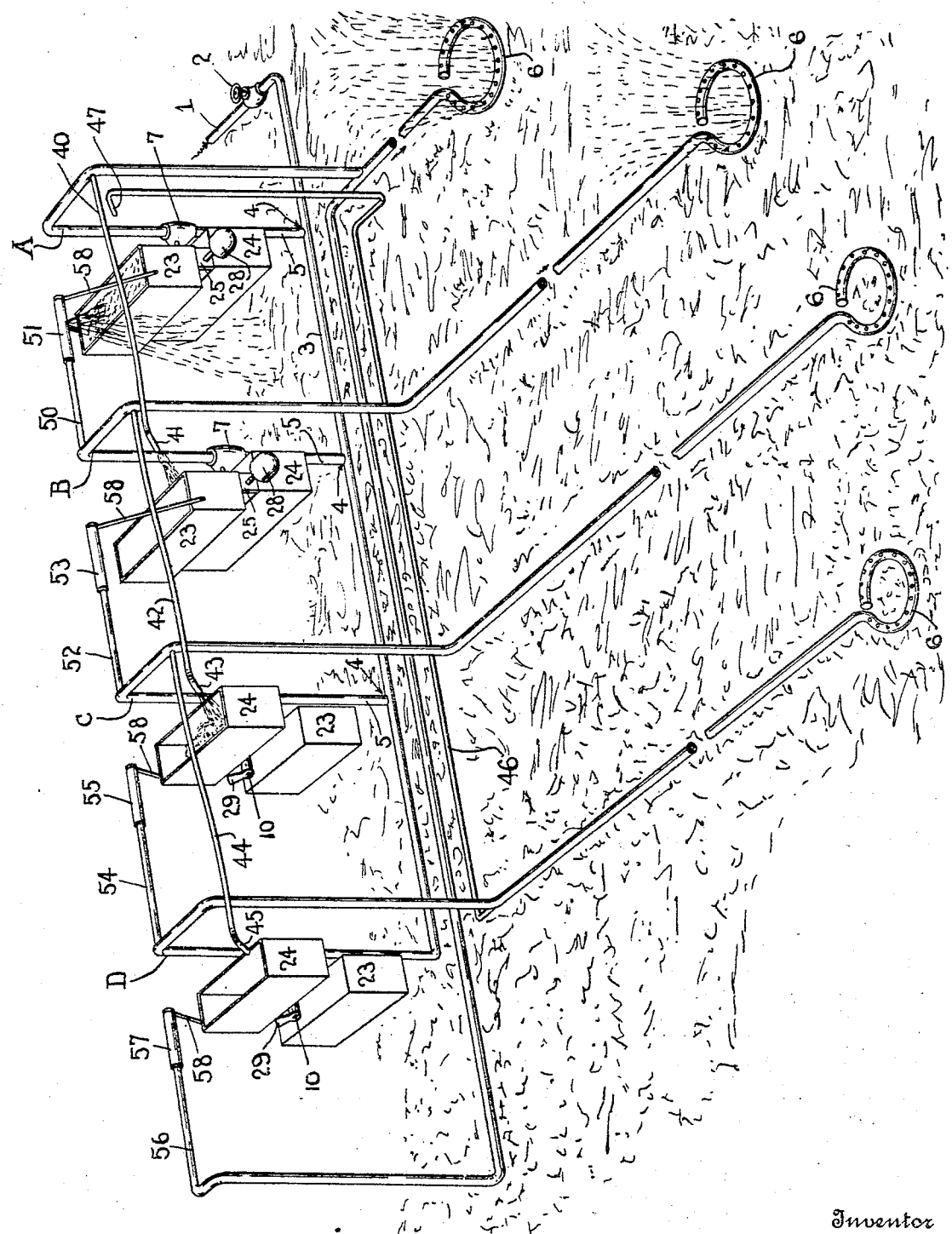
Inventor
George Zint
By H. B. Willson & Co.
Attorneys
Witnesses
L. B. James
C. Schultzer

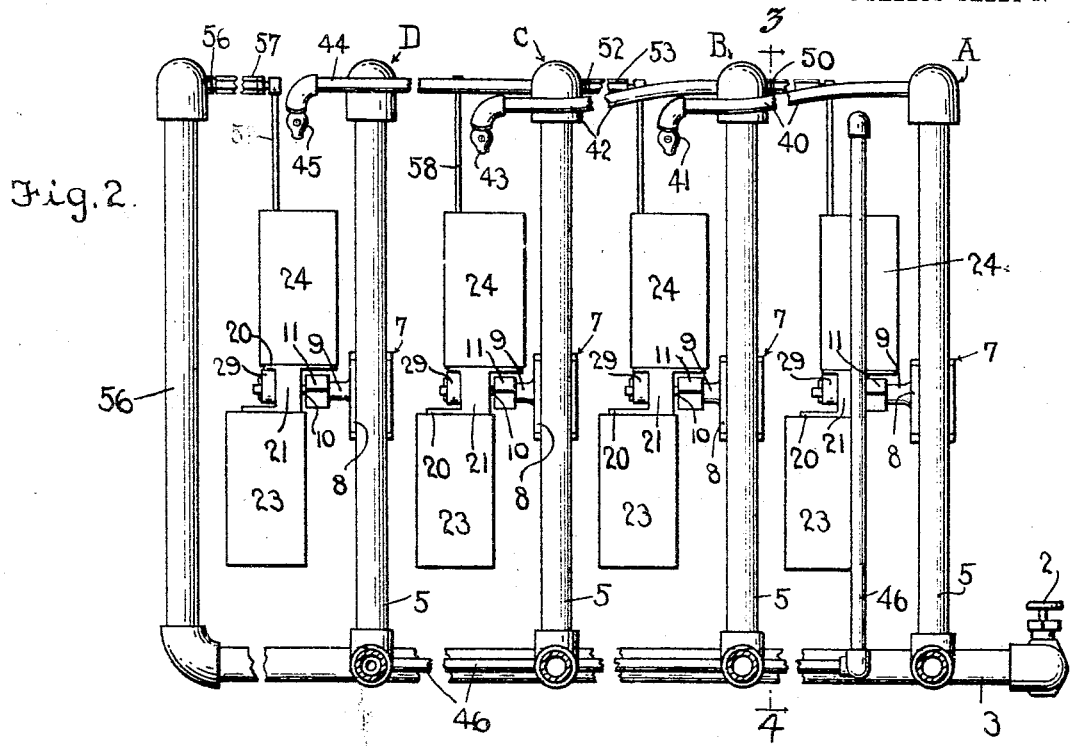
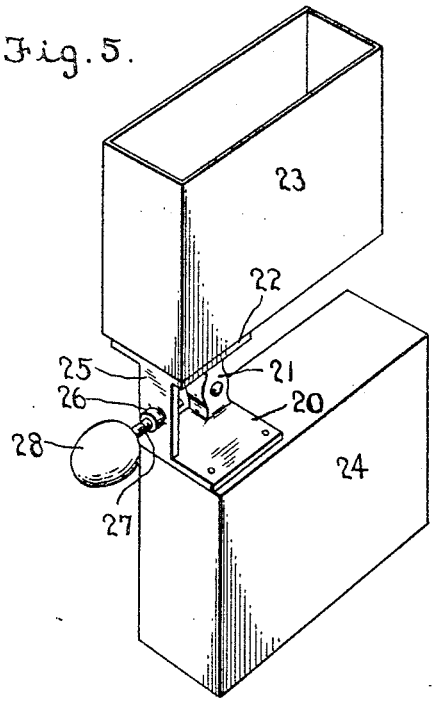
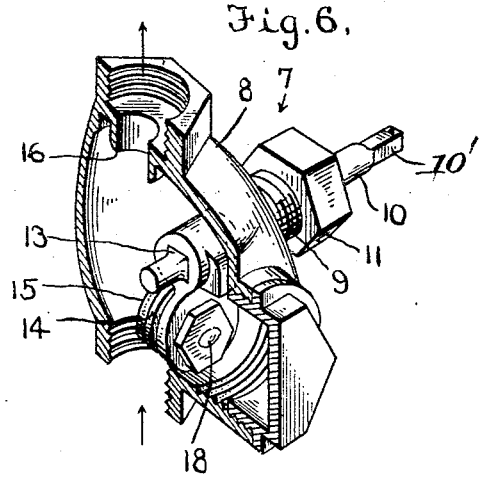
Inventor
George Zint

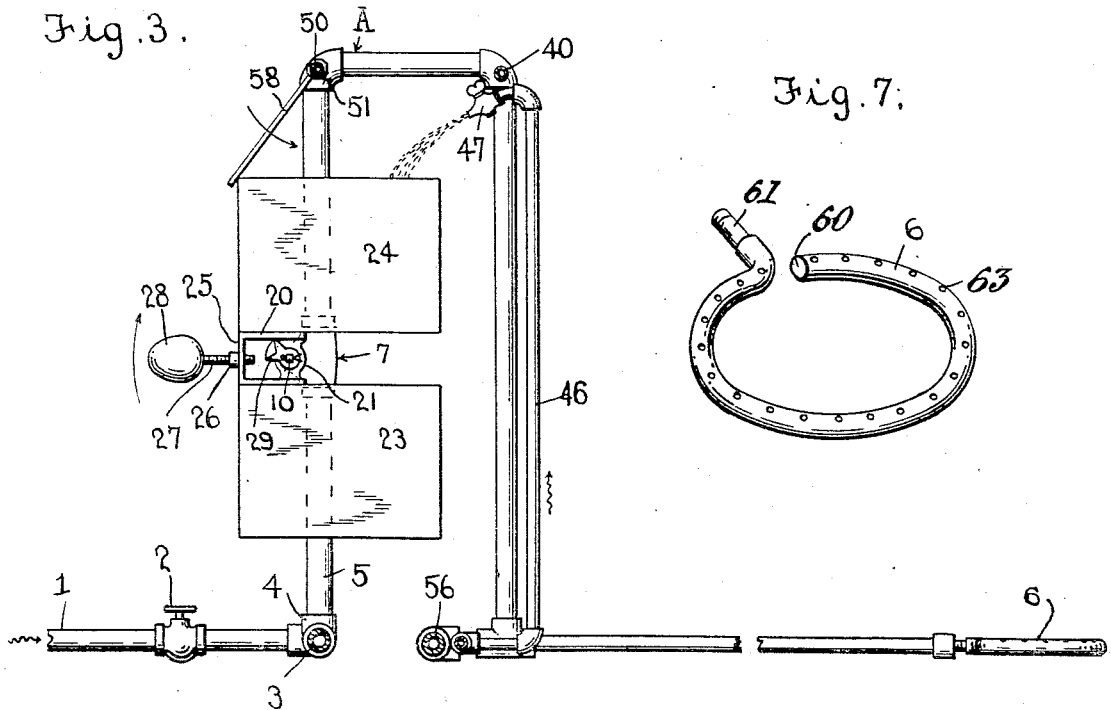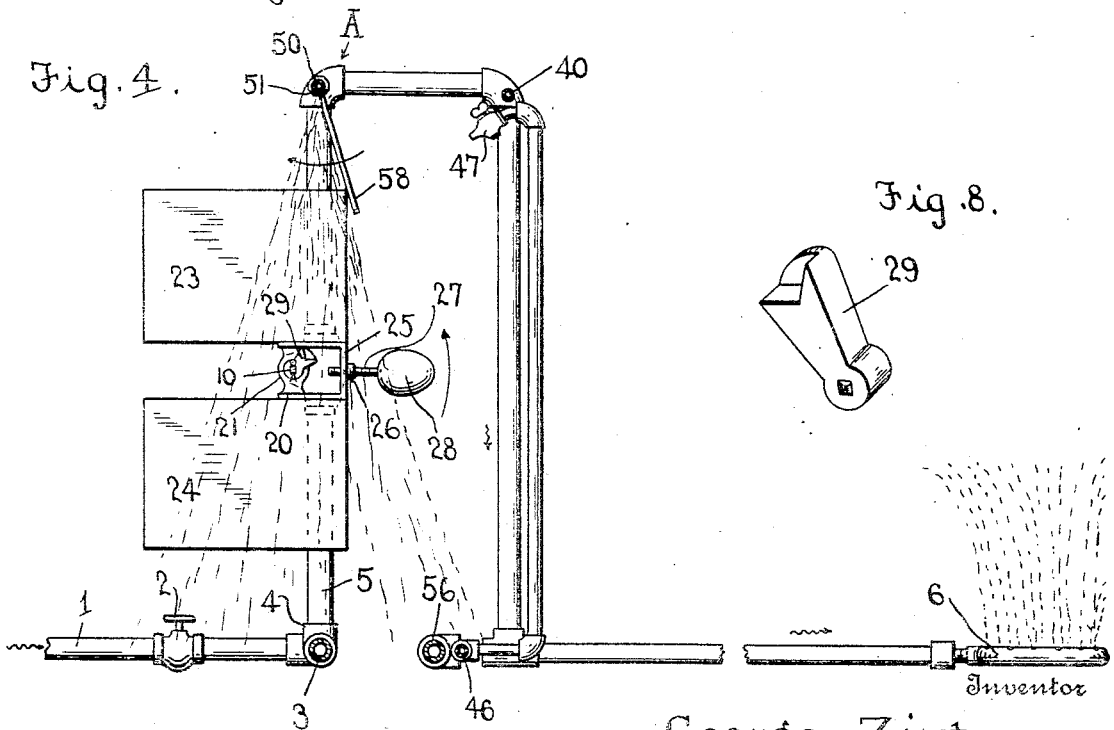

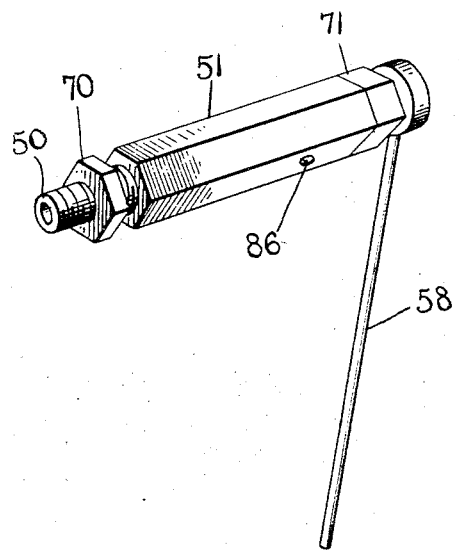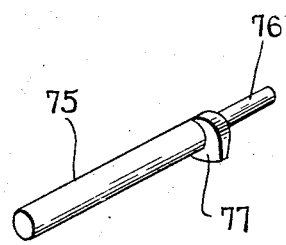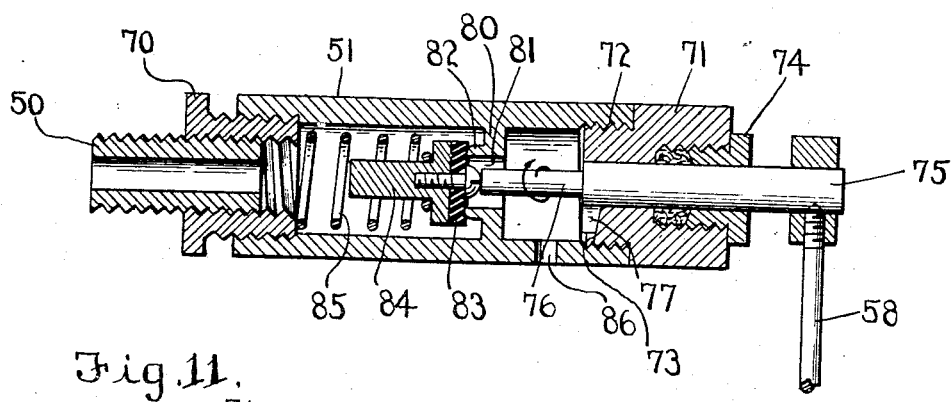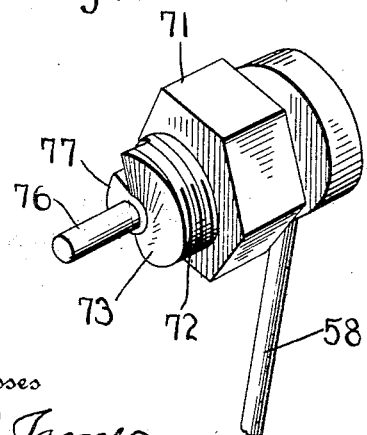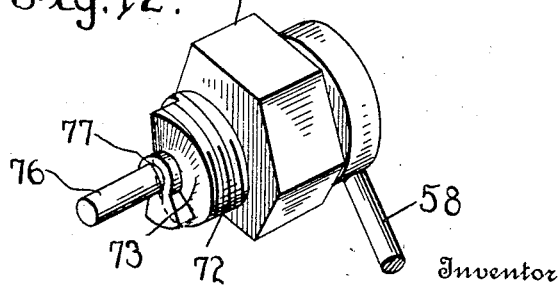

UNITED STATES PATENT OFFICE.

GEORGE ZINT, OF WAPAKONETA, OHIO.

AUTOMATIC SPRINKLER.

1,131,767.   Specification of Letters Patent.   Patented Mar. 16, 1915.

Application filed August 21, 1913. Serial No. 785,907.

*To all whom it may concern:*

Be it known that I, GEORGE ZINT, a citizen of the United States, residing at Wapakoneta, in the county of Auglaize and State of Ohio, have invented certain new and useful Improvements in Automatic Sprinklers; and I do declare the following to be a full, clear, and exact description of the invention, such as will enable others skilled in the art to which it appertains to make and use the same.

This invention relates to irrigation and sprinkling, and more especially to the systems thereof; and the object of the same is to construct a plant whereby a certain area may be automatically sprinkled and yet an excessive use of water will be avoided. The same general object was carried out by my prior U. S. Patent No. 1,038,060, dated September 10, 1912, and on which the present invention is an improvement. Broadly speaking, the idea is to construct a sprinkling system whose main or supply pipe is connected with a suitable source and is led around the user's premises if it be a field or lawn, or even if it be a good sized farm, or the supply pipe might be led along a street which is to be sprinkled. At suitable points are erected any number of standards whose upper ends carry or are connected with sprinkler heads, and the standards have main valves in their bodies and means whereby the various valves are opened and closed at intervals by the weight of water accumulating in buckets that are rotatably mounted on the valve stems so that they will turn the same from time to time; and these buckets are filled by water passed through control pipes from other standards in a manner which will be set forth below.

The object of the present invention is to effect certain improvements in a system of this character whereby the same is simplified without sacrificing the general end in view.

Details will appear in the following specification and claims, and are shown in the drawings wherein—

Figure 1 is a diagrammatic perspective view illustrating a gang of four of such standards and the devices carried thereby the valves 7 in standards A and B being open. Fig. 2 is an elevation of this gang on a larger scale, all of the valves being closed. Figs. 3 and 4 are cross sections on the line 3—4 of Fig. 2, showing the parts in different positions. Fig. 5 is a perspective detail of one of the pairs of buckets. Fig. 6 is a perspective section of one of the main valves. Fig. 7 is a perspective view of the sprinkler head; Fig. 8 is a perspective detail of the cam. Fig. 9 is a perspective detail of the spray valve. Fig. 10 is an enlarged longitudinal sectional view of said valve. Figs. 11 and 12 are still further enlarged perspective details of one end of this valve. Fig. 13 is a perspective detail of the plunger forming a part of this valve.

In the embodiment of my invention as illustrated on the accompanying drawings, the numeral 1 designates a source of water power, which in city districts will be some sort of connection with the main, and 2 is a service cock in said source, the same controlling the flow of water along the main or supply pipe 3 of my improved system, which pipe in the diagrammatic view shown on Fig. 1 is straight although in practice it may surround a lawn, lot or field, it may lead up one side of a street, or it may lead up one side and down the other side of the street, and its general disposition is susceptible of considerable modification as also are the details yet to be described. It is quite possible that the last or fourth standard hereinafter described, may be disposed near to the first standard and in that case the control pipes would be somewhat differently arranged. While the sprinkler heads are illustrated in Fig. 1 as lying on the ground and connected by pipes with the upper ends of the standards, it is quite possible that these sprinkler heads could be supported in the air by said standards; and the construction of the heads themselves is not essential, although I have my preference as will be seen below. At various points in the main or supply pipe 3 are T-couplings 4 from each of which rises a standard 5 which eventually leads to a sprinkler head 6 as shown. The standards may be of ordinary water pipe, of a gage dependent upon the amount of water to be passed through them, and of a height and location consistent with the work to be performed. The supply pipe may be buried beneath the ground and the standards rise out of it, in which case the system could be left standing throughout the winter season and the supply cut off at the point 2 and the pipes drained of water so that freezing could not occur. Located at a suitable point within each standard is a main valve 7 whose construction is best illustrated in Fig. 6. The casing 8 thereof has an offset 9 on one side through which the valve shaft 10 extends, the same being by preference mounted for rotation within a gland nut 11 which is threaded onto the offset 9 to prevent leakage. On the angular portion 13 of the shaft is mounted the valve head 14 which by preference consists of a disk of metal having removably secured thereto a soft facing 15 (as of rubber) adapted to close upward against the seat 16 (which also may be of rubber) when the shaft 10 is turned in the proper direction. When the shaft 10 is turned in the opposite direction, however, the valve head 14 assumes a vertical position and the water may flow upward through the standard and valve casing without interruption. The valve head 14 may be removed for repair when necessary; and similarly the facing 15 may be connected with the head 14 in any detachable manner, as by means of a bolt 18 as shown. While I prefer this type of valve for use in systems where the water pressure is not excessive, I do not wish to be limited thereto and it is quite possible that other forms of valves may be adopted in high pressure localities. Each standard 5 of my improved system being thus provided with a valve, if now means be provided to open and close these valves at intervals and successively along the line of the system, it will be clear that the average volume of water may be utilized to sprinkle first one area and then another over the premises being irrigated. By my invention I perform this duty automatically or by the weight of the water in a manner which will be explained below.

Journaled on the shaft 10 where it projects beyond the bushing 11 is a bearing 21 at the center of a cross head 20 whose arms 22 carry buckets adapted alternately to be filled with water and emptied, and these buckets 23 and 24 are preferably formed of sheet metal and in rectangular configuration, rather thin and deep as shown and with their bottoms mounted on the arms 22 so that their open ends or mouths project away from each other opening in opposite directions and their bodies stand offset with respect to each other as shown in Fig. 2. The two arms 22 are connected by a cross arm 25 carrying a nut 26 into which screws a threaded stem 27 projecting from a weight 28, and the stem and weight project laterally from the cross arm 25, or in other words at right angles to the line on which said buckets project from said cross head. Mounted on the squared outer end 10' of the shaft 10 is a cam 29, preferably shaped as shown in Fig. 8, but whose outer or active end is so shaped and of such size that it may move between the two arms 22 with some lost motion. The purpose of this detail of construction is to permit the buckets when they revolve through half a circle to turn the shaft 10 through a quarter circle and move the valve 14 from its open position shown in Fig. 6 to a closed position for a purpose yet to appear.

My system also contemplates the employment of a series of what may be called "control pipes" leading from one standard to another, and these may well be of small lead pipe or any other metal which can be conveniently applied and adjusted, with suitable couplings and connections where the control pipe communicates with the iron pipe of larger gage. I may here say that lead pipes are preferably used so that where the matter of cost is an important item the user may dispense with the pet cocks yet to be described and secure the same end by pinching the lead pipe together or nearly together at its end and leaving a small orifice which will form a jet in the same manner as would be produced by a pet cock, although of course he loses the advantage of having the jet adjustable in size unless he bores out the orifice to make it larger or pinches the pipe to make it smaller. While these pipes and pet cocks bear different numbers below for purpose of identification, their construction will doubtless be similar. A pipe 40 leads from a point in the right hand or first standard A above its main valve, to a pet cock 41 above the opening bucket 24 of the main valve connected with the second standard B, a similar pipe 42 leads from the second standard B to a pet cock 43 above the opening bucket 24 of the third standard C, and a similar pipe 44 connects the third standard C with a pet cock 45 above the bucket of the fourth standard D. In the present illustration, embodying a gang of four standards as seen in Fig. 1, a pipe 46 leads from the fourth standard D back to a pet cock 47 standing above the opening bucket 24 of the first standard A, but if the four standards were disposed at the corners of a square for instance this last pipe 46 would be constructed on the same plan as the other pipes 40, 42 and 44. I may here explain that I speak of an "opening bucket" because it is that one which when filled with water causes the rotation of the shaft 10 in a proper direction to open the main valve 14 described above, and in a similar manner I will speak of a "closing bucket" throughout this description. In somewhat similar manner a fine control pipe 50 leads from the second standard B above its main valve back to a spray valve 51 disposed above the closing bucket 23 which is mounted on the main valve of the first standard A, another pipe 52 leads from the standard C to a spray valve 53, and a spray pipe 54 leads from the standard D to a spray valve 55. The spray valve 57 over the bucket of the last standard D is fed through a pipe 56 which, when the parts are disposed as diagrammatically illustrated in Fig. 1, is led from the standard A past all the other standards; but here again, as explained above, if the fourth standard D stands near the first standard A the arrangement and disposition of this pipe 56 will be like the others numbered 50, 52 and 54. Each spray valve will by preference be of the construction set forth below, but it is actuated by a swinging handle 58 which hangs from it in position to be struck by the edge of either bucket as the latter comes uppermost, with the obvious purpose of opening this valve when one bucket ascends and closing it when the other bucket ascends. This being the purpose, any valve which will answer may be substituted for the spray valve described below, but I prefer to use a rather wide spray at this point for the following reason. If we assume that the standards are erected at the corners of a lawn or field, or that they are disposed along a street, the sprinkler heads 6 will be quite remote from the standards, possibly even connected with them by flexible piping or hose, and will be of ample capacity because they are to do the bulk of the irrigation. The result will be that that portion of the lawn or the street (in the latter case, the sidewalk) which is along the line of the standards will not be sprinkled, although it will receive the water dumped from the buckets as described below. Therefore I prefer to use spray valves 51 for filling either the closing or the opening buckets, and adjustable means such as the pet cocks referred to for filling the opposite buckets. It is necessary to adjust the volume of water passing through only one of the sets of control pipes, and the pet cocks answer very nicely for this purpose. When, therefore, the other set of control pipes delivers water into the opposite buckets through spray valves, some of the water falls into the bucket but the most of it falls onto the pavement or onto this part of the lawn, and the sprinkler heads 6 are left to do the bulk of the work of irrigation. However, I will say at this point that it is possible to omit the spray feature of the valves on this set of control pipes, as any suitable valve may be employed which is opened and closed by a pendent handle or stem.

With the parts constructed as described and a gang of standards set up as illustrated diagrammatically in Fig. 1, the action of this system will be as follows:—The service cock 2 being opened, communication is established between the service pipe 1 and the supply pipe 3, but as all the main valves 7 will be closed at the beginning of the action of this system nothing will occur at first. The first or right-hand valve in the illustration is now opened by hand, which is done by reversing the position of the buckets so that the closing bucket 23 comes uppermost as seen in Figs. 1 and 5. This opens the right-hand main valve 7 as seen in Fig. 6 and water flows up the first standard 5 and the first or right-hand sprinkler head 6 begins to work. A small proportion of the water passing through this standard will pass out the fine pipe 40 to the pet cock 41 and by the latter will be delivered into the opening bucket 24 on the second standard B. This pet cock 41 is by preference adjusted so that after about three minutes sufficient water will have accumulated in the bucket 24 to overcome the weight 28, when the parts automatically turn to the position shown in Fig. 1 and the closing bucket 23 comes uppermost as the first closing bucket 23 was set by hand. The parts then stand substantially as seen in Fig. 1 and the second sprinkler head 6 is beginning to work. This admits a small portion of the water from the second standard 5 through the fine pipe 42, and Fig. 1 shows it as beginning to run out the pet cock 43 into the opening bucket 24 of the third standard. Meanwhile, however, as soon as water began to flow through the second standard B some of it passed through the fine pipe 50 back to the spray valve 51 which was opened when the first pair of buckets was inverted by hand, and Fig. 1 shows this valve as emitting a spray, most of which will fall on the pavement or on that portion of the lawn but some of which will drop into the bucket 23. The disposition of the spray valve and the proportion of water from it which falls into this bucket will determine the time when the first pair of buckets will turn over in the opposite direction in a manner not necessary to illustrate as either of the buckets on the standards C and D will show how the first pair of buckets would then look. When the water in the first closing bucket 23 overbalances its weight 28, this pair of buckets will move and the first main valve 7 will be closed automatically. Such closing shuts off the supply of water to the first sprinkler head 6 and simultaneously shuts off the portion of said supply which has been flowing through the control pipe 40 and the pet cock 41, but which could not fall into the closing bucket 23 of the second standard because said bucket is offset from the line of discharge from the pet cock 41 as shown, and the water therefore falls onto the bottom of the other bucket 24 and runs off onto the ground. I prefer, however, that the size of the spray issuing from the valve 51 and falling into the bucket 23 will be such that the relative action of parts will be properly timed, although this is a matter which may be left to the user. The action already described is repeated for the third and fourth standards C and D, and, while the arrangement of the fine pipe 56 for the last standard appears to be somewhat different from that for the other standards, it will be observed that the action on the bucket of the first standard is the same as the action of any unit on the parts of that next in advance. Such being the case, after the last or left hand sprinkler head 6 has been working for a time it is cut off like the others, and the water led back through the fine pipe 46 and pet cock 47 soon automatically reverses the first pair of buckets (which were reversed by hand to start the system working) with the result that the described operation is repeated throughout the gang of standards.

While I do not wish to be limited to any specific form of sprinkler head, that best shown in Fig. 7 is preferred; that is to say, a small piece of brass tubing may be closed at one end as at 60 and connected with a threaded nipple 61 at its other end, the same having threads of standard gage if the pipe leading to the sprinkler head is of metal, or threads of hose gage if said pipe is of rubber; and this piece of pipe is then bent into nearly a circle as shown and provided in its upper part with fine perforations 63. The details of the main valve need not be illustrated, as they are well brought out in my former patent. The pet cocks, T-couplings, and other plumbing connections are those which can be purchased in the open market, and need not be amplified. The sizes and materials of parts are not essential, and the weights 28 with their threaded stems 27 are obviously for the purpose of affording adjustment so that the buckets will automatically reverse at the proper moment. I do not wish to be limited to the specific construction of parts as set forth above, as changes may be made therein without departing from the principle of my invention.

The preferred form of spray valve is best illustrated on Sheet 4, including a nipple 70 which connects its body 51 with the control 50. Said body or casing is in two sections, the outermost numbered 71 preferably screwing into the innermost as shown at 72 and having on its inner end a cam surface 73 struck on a spiral around its bore, while the outer end of the latter receives a gland 74 through which passes the plunger 75. Secured to the outer end of said plunger in any suitable manner is the handle 58 which hangs therefrom as shown. The inner end of the plunger is reduced into a pin 76, and between this pin and the body of the plunger is a small cam 77 which is shaped to coact with the cam surface 73 on the inner end of this section of the valve casing. The other or main section has between its ends an internal transverse partition 80 pierced with an opening 81 surrounded on one side by a valve seat 82, and against this seat is adapted to close the head 83 of the valve proper, which head is mounted on a stem 84 movable longitudinally within this portion of the casing, the whole valve head being projected toward the seat by a coiled expansive spring 85. The pin 76 projects through the opening 81 into contact with the head when the parts are assembled as shown in Fig. 10, and at this time the spring 85 holds the valve closed and holds the cams 73 and 77 in close contact with each other with the handle 58 standing in the position shown in Figs. 9, 10 and 11. If now this handle is swung to the position shown in Fig. 12, the cam 77 on the plunger 75 moving over the cam surface 73, and acting in the nature of a screw, causes the entire plunger to be projected inward so that its pin 76 pushes the head 83 of the valve off the seat 82, and water may flow through the control pipe 50, past the valve, and out of a spray opening 86 formed in the lower side of the casing 51 as best seen in Fig. 10, although the casing is turned a little toward the front in Fig. 9. I do not wish to be limited to the shape or character of this spray opening, as there might of course be several such openings between the partition 80 and the outer casing section 71, and these openings might in fact carry nozzles of any appropriate type. When the buckets are restored to their original position, the handle 58 is pushed back to the position shown in Figs. 9, 10 and 11, and the spring 85 is permitted to expand so that the valve is automatically closed and the plunger moves outward as the reverse or unscrewing action of its cams 77 and 73 will permit. By adjusting the position of the handle 58 on the plunger 75, the action of the valve may be controlled; or its action may be controlled by adjusting the position of the two casing-sections 51 and 71 where they are screwed together at 72. Such connection between them at this point gives access to the interior of the casing to the right of the partition 80 shown in Fig. 10, and removal of the nipple 70 gives access to the interior thereof to the left of said partition. I have spoken of this valve throughout the specification as the "spray valve" because it is my intention that it shall emit a spray, some of which will fall into the bucket and the remainder of which will drop on the ground; but it is quite possible the user may prefer to have this valve emit a fine stream, all of which will be received in the proper bucket, so that the reversal of the buckets will occur sooner. I do not, therefore, wish to be limited in this respect, no matter what this valve is called throughout this specification and claims; nor do I wish to be limited as to its details of construction and materials of parts. The valve could, in fact, be replaced by one of some other type if preferred, and the fundamental principle of the invention would be carried out if any valve were used which would be open and closed by the movement to one side or the other of a pendent handle substantially like that numbered 58, which handle would stand in the path of the buckets as they turned in one direction or the other.

What is claimed as new is:

1. The combination with a cross head having a bearing at its mid-length, arms at its outer ends standing in planes parallel with each other, said arms being offset one with respect to the other, but having the edge of one arm overlying the correspondingly opposite edge of the other arm, and a cross arm connecting said overlying edges; of two substantially rectangular buckets whose bottoms are secured on said parallel arms so that their bodies are offset with respect to each other and whose mouths face away from each other, for the purpose set forth.

2. The combination with a cross head having a bearing at its mid-length, arms at its outer ends standing in planes parallel with each other, said arms being offset one with respect to the other, but having the edge of one arm overlying the correspondingly opposite edge of the other arm, and a nut on said cross head whose bore stands parallel with said arms; of two substantially rectangular buckets whose bottoms are secured on said parallel arms so that their bodies are offset with respect to each other and whose mouths face away from each other, and a weight having a threaded stem adjustably mounted in said nut, for the purpose set forth.

3. The combination with a cross head having a bearing at its mid-length, arms at its outer ends standing in planes parallel with each other, and a nut on said cross head whose bore stands parallel with said arms; of two substantially rectangular buckets whose bottoms are secured on said parallel arms and whose mouths face away from each other, and a weight having a threaded stem adjustably mounted in said nut, for the purpose set forth.

4. The combination with an upright pipe, a valve therein whose head swings through one-quarter of a circle from open to closed position during the oscillations of its shaft, and a cam on said shaft; of a pair of buckets whose bottoms stand parallel and whose mouths open in opposite directions, and a cross head rigidly connecting said bottoms and having a bearing loosely mounted on said shaft and arms disposed on opposite sides of said cam, but spaced farther apart than the width of said cam, and adapted to alternately engage said cam to open and close said valve.

5. The combination with an upright pipe, a valve therein whose head swings through one-quarter of a circle from open to closed position during the oscillations of its shaft, and a cam on said shaft; of a pair of buckets whose bottoms stand parallel and whose mouths open in opposite directions, a cross head rigidly connecting said bottoms and having a bearing loosely mounted on said shaft and arms disposed on opposite sides of said cam and adapted to alternately engage therewith to open and close said valve, said arms being spaced farther apart than the width of said cam so that the latter has some lost motion between them, each arm being secured to its bucket at a point off the center of gravity of the latter, a cross arm connecting said parallel arms, and a weight carried by said cross arm.

6. The combination with an upright pipe, a main valve therein whose head swings through one-quarter of a circle from open to closed position during the oscillations of its shaft, and a cam on said shaft; of a pair of buckets whose bottoms stand parallel and whose mouths open in opposite directions, a cross head rigidly connecting said bottoms and having a bearing loosely mounted on said shaft and arms disposed on opposite sides of said cam and adapted alternately to engage therewith to open and close said valve, said arms being spaced farther apart than the width of said cam so that the latter has some lost motion between them, each arm being secured to its bucket at a point off the center of gravity of the latter, a cross arm connecting said parallel arms and standing in the plane of one end of both buckets, a stem projecting from said arm on a line parallel with said parallel arms, and a weight carried by said stem.

7. The combination with an upright standard, a main valve whose stem oscillates through one-quarter of a circle in its casing as the valve head opens and closes, and a cam fast on the outer end of said stem; of a cross head having a bearing journaled on said stem between the casing and cam, and parallel plates disposed on opposite sides of said cam and adapted alternately to engage therewith to open and close said valve, said arms being spaced farther apart than the width of said cam so that the latter has some lost motion when the cross head is oscillated through one half a circle, and oppositely facing buckets carried by said plates.

8. The combination with an upright standard, a main valve whose stem oscillates through one-quarter of a circle in its casing as the valve head opens and closes, and a cam fast on the outer end of said stem; of a cross head having a bearing journaled on said stem between the casing and cam, and parallel plates disposed on opposite sides of said cam and adapted alternately to engage therewith to open and close said valve, said arms being spaced farther apart than the width of said cam so that the latter has some lost motion when the cross head is oscillated through one half a circle, said plates being offset one with respect to the other, substantially rectangular buckets whose bottoms are mounted on said plates and whose mouths face in opposite directions, two control pipes whose outlet ends are disposed above the respective buckets when in their highest positions, and means for passing water through these pipes.

9. The combination with an upright standard, a main valve whose stem oscillates through one-quarter of a circle in its casing as the valve head opens and closes, and a cam fast on the outer end of said stem; of a cross head having a bearing journaled on said stem between the casing and cam, and parallel plates disposed on opposite sides of said cam and adapted alternately to engage therewith to open and close said valve, said arms being spaced farther apart than the width of said cam so that the latter has some lost motion when the cross head is oscillated through one-half a circle, said plates being offset one with respect to the other, substantially rectangular buckets whose bottoms are mounted on said plates and whose mouths face in opposite directions, two control pipes whose outlet ends are disposed above the respective buckets when in their highest positions, manually controlled means for passing water through one of these pipes, a valve in the other pipe, and a handle pendent from this valve in position to be struck by the buckets alternately as they are reversed.

10. The combination with an upright standard, a main valve whose stem oscillates through one-quarter of a circle in its casing as the valve head opens and closes, and a cam fast on the outer end of said stem; of a cross head having a bearing journaled on said stem between the casing and cam, and parallel plates disposed on opposite sides of said cam and adapted alternately to engage therewith to open and close said valve, said arms being spaced farther apart than the width of said cam so that the latter has some lost motion when the cross head is oscillated through one half a circle, said plates being offset one with respect to the other, substantially rectangular buckets whose bottoms are mounted on said plates and whose mouths face in opposite directions, two control pipes whose outlet ends are disposed above the respective buckets when in their highest positions, a pet cock at the end of one of these pipes directing its jet into one bucket when it is uppermost or onto its bottom when it is reversed, a spray valve at the end of the other pipe directing a portion of its spray into the other bucket when it is uppermost, and means for automatically opening and closing this valve by the reversal of the buckets.

In testimony whereof I have hereunto set my hand in presence of two subscribing witnesses.

GEORGE ZINT.

Witnesses:
  THEO. H. TANGEMAN,
  MARION STREIGHT.